3,195,271
PROCESS FOR CULTURING AND RECOVERING ALGAE AND CARAGEENIN
Clarence G. Golueke, San Pablo, and William J. Oswald, Concord, Calif., assignors to The Regents of The University of California, Berkeley, Calif.
Filed May 18, 1962, Ser. No. 195,712
14 Claims. (Cl. 47—1.4)

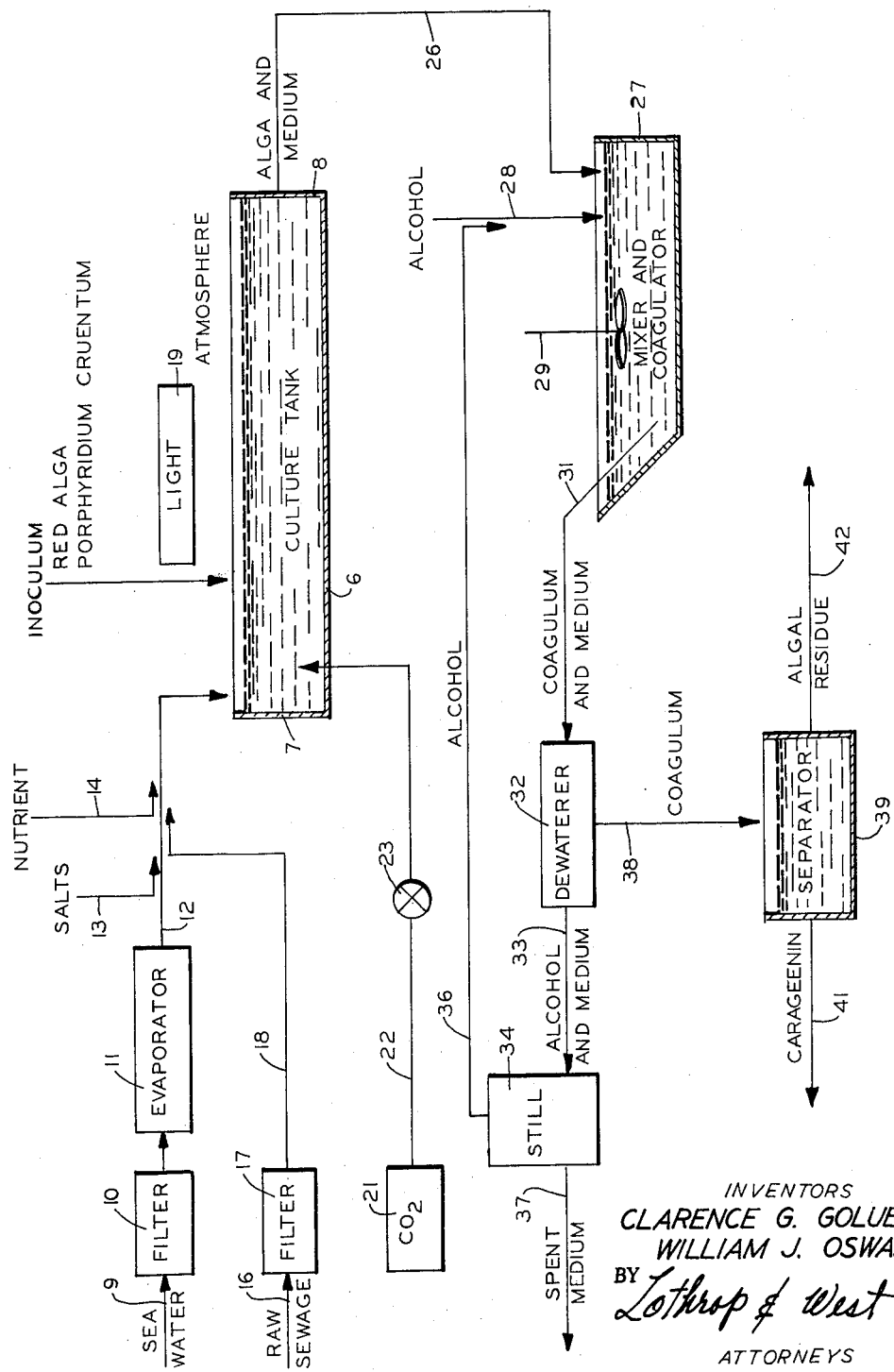

Our invention concerns the artificial mass culture of algae and is related to the process set forth in Patent No. 2,867,945 issued January 13, 1959 to Gotaas and Oswald and assigned to the assignee of the present application. The process of that patent is concerned with culture of green algae, particularly *Chlorella pyrenoidosa*, while the present process is especially related to the culture of red algae, particularly the alga *Porphyridium cruentum*, and is especially concerned with the recovery of that alga from the culture medium. *Porphyridium cruentum* for some purposes is valuable in itself and the process stops with its recovery. The liquid phase of the culture is very viscous so that separation of the alaga from the medium is very difficult and uncertain by ordinary means. Sometimes this alga is valuable for a constituent, particularly carageenin, in which case the process is continued for the recovery of this constituent carageenin.

It is therefore an object of the invention to provide a process especially adaptable to the artificial mass culture of red algae, particularly *Porphyridium cruentum*.

Another object of the invention is to recover the cultured alga from the mass culture medium in an effective and economical way.

Another object of the invention is to provide a red alga, particularly *Porphyridium cruentum* in a form so that carageenin and other slimy, mucilaginous materials can be readily removed therefrom.

Another object of the invention is to provide an improved process for the artificial mass culture of red algae.

Other objects together with the foregoing are attained in the practice of the process described in the accompanying description and as illustrated in the process shown in the accompanying drawing.

The drawing is a diagrammatic representation of the flow of the various materials and the relationship of the steps in our improved process.

Artificial mass culture of algae so far as we are aware has been largely confined to the culture of green algae; for example, *Chlorella pyrenoidosa*, since various attempts for the artificial continuous mass culture of red algae have not been successful. Although continuous artificial cultures of red algae can be started, it is the experience heretofore that such cultures fail after a short time. We have found that red algae, specifically *Porphyridium cruentum*, can be successfully cultured and propagated under rather widely variant conditions providing certain measures are taken.

In carrying out our process we utilize a culture tank 6 of the sort shown in the mentioned Gotaas et al. patent. This tank is a container open at its top to the atmosphere and is sufficiently large to contain material for detention over a number of days. The tank is preferably elongated so that it has an inlet end 7 and an outlet end 8 with flow taking place gradually from the inlet end to the outlet end.

In accordance with our proces, there is introduced into the culture tank 6 a supply of liquid material derived from a line 9 furnishing sea water. The raw sea water can be directly utilized, but it is preferred that it first be passed through a filter 10 in order mechanically to remove any contained detritus and so that it is reasonably clean and clear. The sea water can be directly utilized with its normal salinity, and we have found that in the culture of *Porphyridium cruentum* the salinity of the culture medium should be maintained at a value at least that of sea water. In fact, it is preferred to increase the salinity and consequently the density of the liquid medium above that of ordinary sea water since this tends to inhibit the growth of other, undesired algae.

The liquid content is reduced and the salinity of the sea water is increased by passing it through an evaporator 11 until the volume is reduced to one-half. This increases the salinity and density but some of the contained salts are precipitated and are lost. To make these up, there enters the effluent line 12 from the evaporator a supply line 13 for bringing in additional salts. The additional material can include not only salts normally present in sea water, but can also include nutrients. For clarity a separate nutrient line 14 is shown, but additions of various sorts can be made at this point to the treated sea water in the line 12. The additional materials preferably include micro elements as set forth by Arnon as modified by Krauss (Carnegie Institution of Washington, publication 600, page 342 (1953)), these being added at the rate of 1 ml. per liter of solution, but we prefer to add the materials at one-half the concentration set forth by Krauss.

We add in the line 13 (or 14) magnesium sulfate in the amount of 250 micrograms per liter of culture and also add one milliliter of a ferric potassium EDTA stock solution per liter of culture. The latter solution is according to Carnegie Institution of Washington, Publication 600 (1953), page 121 (reference 235 to Jacobson). The nutrient line 14 (or the line 13); also conducts 300 milligrams of urea per liter of culture into the modified sea water.

In addition to the sea water, added salts, micro elements and nutrients, we have found that it is essential under the conditions described herein for the culture of *Porphyridium cruentum* that there be added sewage or other organic wastes, hereinafter referred to generally as sewage. The filtered sewage is added in sufficient amount to bring the specific gravity of the resultant liquid to 1.030 at 25 degrees C. We are not yet certain of the ingredient or ingredients in raw sewage which are of importance, but we have demonstrated that without the addition of the sewage as described herein the artificial mass culture of *Porphyridium cruentum* does not proceed, whereas with the addition of the sewage the culture is highly successful.

Pursuant to our process we take raw sewage (from the outfall of the city of Richmond, California) through a line 16 and pass it through a filter 17 to remove mechanically entrained deleterious material. The filtered raw sewage is then passed through a line 18 into the line 12 containing the modified sea water with added salts, nutrient and chemicals. The preconditioned sea water and the filtered raw sewage are together introduced into the culture tank 6, preferably adjacent the inlet end 7 thereof. When sufficient liquid material is in the tank, there is added thereto an inoculum of the alga to be cultured; in this instance, the red alga, *Porphyridium cruentum*. The culture tank, being open to the atmosphere, receives sunlight and can in addition be provided with a source 19 of light such as from incandescent or fluorescent fixtures.

While the alga can obtain its carbon dioxide requirement from the atmosphere and from the breakdown of sewage, it is sometimes desired to add carbon dioxide from a separate source 21. That is accomplished by providing a suitable tank supplying $CO_2$ through a duct 22 controlled by a valve 23 and leading into the tank at an appropriate point. The valve 23 can be closed or opened to the desired extent to afford no or a measured amount of carbon dioxide in addition to that available from the atmosphere. Also, the carbon dioxide flowing into the culture tank can be utilized as an agitating agent, if that is deemed desirable.

The algae in the tank are retained therein for a predetermined detention period. The detention period is defined as the time in days during which the algae are nominally retained within the culture tank 6. This period is expressed as the total volume of the entire growth unit divided by the displacement volume for each day.

During its detention in the culture tank the alga grows and increases according to well understood growth statistics and is effective under the influence of light to use the nutrient medium available. No care is taken to maintain the culture tank under sterile conditions and no particular control of the hydrogen ion concentration of the culture medium is required since experience has indicated that the pH of the culture rarely varies beyond the range 6.5 to 7.0. It is of interest, however, that the salinity of the culture in the tank be maintained at least as high as that of the usual sea water.

While the conditions of culture can be varied within reasonable limits, normal or standard conditions used as a basis for experimentation are: detention period, four days; $CO_2$ concentration, 1 percent; incident light energy, 28 to 30 calories per liter per minute (1100 to 1200 foot candles); and temperature, 26 degrees C. Under these conditions the *Porphyridium cruentum* increases and grows without difficulty. Since the salinity is equal to that of sea water or higher, deleterious algae which would otherwise compete do not thrive. With very minor, inconsequential exceptions, the culture is that of only the desired alga.

Consistent with the predetermined detention period, efflux from the culture tank 8 takes place through a line 26 drawing off some of the medium with the algae contained therein. Although there is a satisfactory production of the desired algae, it is very difficult indeed to separate them from the liquid medium. It is particularly difficult to separate *Porphyridium cruentum* since it is very viscous or mucilaginous and so does not centrifuge well. It appears that the viscosity of the culture increases due to carageenin production, and, in fact, the increase in viscosity is used as an indication of the increase in carageenin. Some of the carageenin appears to go into solution in the culture medium from the algal cells. Although this alga is readily grown according to the conditions described herein, it is virtually impossible to separate it from the growth liquid by any of the ordinarily utilized methods.

Pursuant to this invention, we have found a way of making a good separation. The efflux from the culture tank discharging from the line 26 is received in a vessel 27. To the contents of the vessel alcohol is added through a line 28. While various of the amyl alcohols, and particularly butyl alcohol and methyl alcohol, have been and can be used, the most satisfactory alcohol is ethyl alcohol. Thus, an amount of 80 to 90 percent ethyl alcohol substantially equal to the amount of liquid or fluid therein is added to the vessel 27. If the mere addition of the material does not produce sufficient mixing, a mechanical mixer 29 can be employed. The effect of adding the alcohol is promptly to coagulate the algal and carageenin containing portion of the vessel contents. There results a coagulum of all of the desired constituents as readily identifiable material situated in a relatively separately identifiable thin liquid. The coagulum is quite viscous and forms in stringy bodies.

The coagulum plus some of the entrained medium is withdrawn from the vessel 27, preferably by a mechanical means 31, and discharged into a dewatering device 32. Therein the coagulum is separated from almost all of the liquid materials remaining. The liquid, primarily the alcohol and the culture medium minus the coagulated portion, is then passed through a line 33 into a still 34. When heated the still discharges the alcohol, which is carried by a return line 36 to the alcohol line 28 for reuse.

It is found in practice that except for mechanical entrainment there is very little of the alcohol lost so that recycling of the alcohol is entirely feasible. From the still 34 the remainder of the liquid, which is almost entirely spent culture medium minus algae, is discharged through a line 37. From the dewatering device 32 the separated, coagulated algae and carageenin are passed through a line 38. The algae and carageenin at this point are well separated from the medium and from the coagulating alcohol and can be further processed.

In the present instance it is especially desired to recover the *Porphyridium cruentum* for its relatively large content of carageenin as well as the otherwise coagulated carageenin. For that reason the coagulum is received from the line 38 in a separator 39 in which by known methods the carageenin is removed. Carageenin is taken away in a line 41, whereas the algal residue is removed in a line 42. The residue is the complete *Porphyridium cruentum* minus its carageenin content and is useful for various purposes, for example, cattle feed.

If the carageenin need not be extracted or separated, then the algae-containing coagulum from the line 38 can be diverted directly and entirely to the line 42 for further use as feed and the like.

In accordance with this process, it is possible to effectuate an artificial mass culture of red algae such as the alga *Porphyridium cruentum* on a continuous basis and economically enough to result in commercial algae production. Furthermore, the separation of this particularly mucilaginous alga from its growth medium is effected by a coagulation step utilizing alcohol, particularly ethyl alcohol, the alcohol being readily recovered for reuse and the remaining, separated alga being available for carageenin extraction if desired. Since sea water is utilized, the process can be carried on in places where the availability of fresh water is questionable, and since the concentration of the sea water is at least as great as that normally occurring and preferably is increased over the normal, the growth of unwanted algae, particularly some of the blue-green algae, does not occur since the unwanted algae require and can live only in a much lower salt concentration. The addition of the sewage furnishes some constituent or constituents presently unknown specifically which permit the continued culture of *Porphyridium cruentum* which otherwise dies out in a very few days. Thus in accordance with this invention we have provided a process of continuously culturing and harvesting effectively the alga *Porphyridium cruentum*, making it available for the extraction of carageenin, for which it is an excellent source. Some of the carageenin is apparently contained in the withdrawn culture medium as well as in the algae themselves, the alcohol-induced coagulation containing the algae and also the carageenin previously in the medium. Thus a virtually complete recovery of algae containing carageenin and carageenin itself is effectuated.

What is claimed is:

1. A process of growing and recovering carageenin comprising establishing an artificial mass culture including a body containing sea water, sewage and *Porphydridium cruentum*, withdrawing a portion of said body from the remainder thereof after a predetermined detention period, adding alcohol to said portion to produce a coagulum, separating said coagulum from said portion, and removing carageenin from said coagulum.

2. A process of growing and recovering carageenin comprising establishing a culture of *Porphyridium cruentum* in sea water and sewage, treating a portion of said culture with alcohol to produce a coagulum, separating said coagulum, and removing carageenin from said coagulum.

3. A process of growing and recovering carageenin comprising establishing a continuous culture of *Porphyridium cruentum* in sea water and sewage, removing a portion of said culture from the remainder thereof, treating said portion with ethyl alcohol in approximately the same volume as said portion to produce a coagulum, and removing carageenin from said coagulum.

4. A process of growing and obtaining *Porphyridium*

*cruentum* comprising establishing a continuous culture of *Porphyridium cruentum* in sea water and sewage, removing a portion of said culture after a predetermined detention period, treating said removed portion with alcohol to produce a coagulum, separating said coagulum from said treated portion, and removing *Porphyridium cruentum* from said separated coagulum.

5. A process as in claim 4 in which said alcohol is ethyl alcohol.

6. A process as in claim 4 in which said alcohol is about equal in volume to said portion.

7. A process as in claim 4 in which said alcohol is removed by distillation from said treated portion after the production of said coagulum.

8. A process of growing and recovering carageenin comprising establishing a fluid body containing sea water, sewage and an inoculum of *Porphyridium cruentum* and subject to the atmosphere and incident light, withdrawing a portion of said fluid body after a predetermined detention period, adding alcohol to said withdrawn portion to produce a coagulum containing substantially all of the *Porphyridium cruentum* and carageenin in said portion, separating said coagulum from the remainder of said portion, and removing carageenin from said separated coagulum.

9. A process as in claim 8 in which said alcohol is separated from the remainder of said portion by distillation and is recycled with a subsequently withdrawn portion of said fluid body.

10. A process of growing and recovering carageenin comprising establishing an artificial culture of *Porphyridium cruentum*, treating said culture with alcohol to produce a coagulum, and removing carageenin from said coagulum.

11. A process of growing and recovering carageenin comprising treating *Porphyridium cruentum* with ethyl alcohol to produce a coagulum, and removing carageenin from said coagulum.

12. A process of growing and recovering carageenin comprising treating *Porphyridium cruentum* with alcohol to produce a coagulum, and removing carageenin from said coagulum.

13. A process of growing and recovering *Porphyridium cruentum* from a culture containing the same comprising treating said culture with alcohol to produce a coagulum, and separating said coagulum from the remainder of said culture.

14. A process of growing and recovering *Porphyridium cruentum* comprising establishing a continuous artificial culture in the form of an elongated body containing sea water, sewage and an inoculum of *Porphyridium cruentum*, subjecting said body to light and the atmosphere, adding sea water and sewage at one end of said elongated body, withdrawing a portion of said body from the other end thereof, treating said withdrawn portion with alcohol to produce a coagulum, subjecting said coagulum to dewatering, and removing said *Porphyridium cruentum* from said dewatered coagulum.

References Cited by the Examiner
UNITED STATES PATENTS 2,620,334   12/52   Nielsen.

OTHER REFERENCES

Chemical Abstracts, vol. 54, No. 11, column 11, 343–f; Methods of Hydrobiological Investigation for the Sanitary Survey of Coastal Sea Waters; June 10, 1960.

T. GRAHAM CRAVER, *Primary Examiner.*

ABRAHAM G. STONE, *Examiner.*